W. O. SMITH.
Steam Vaporizers.
No. 200,154. Patented Feb. 12, 1878.
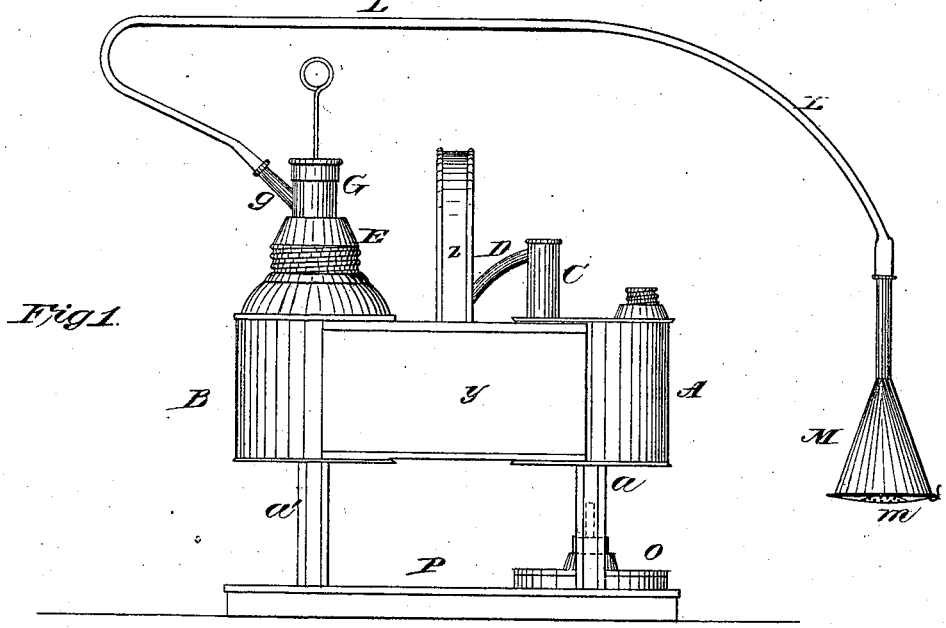
Fig. 1.
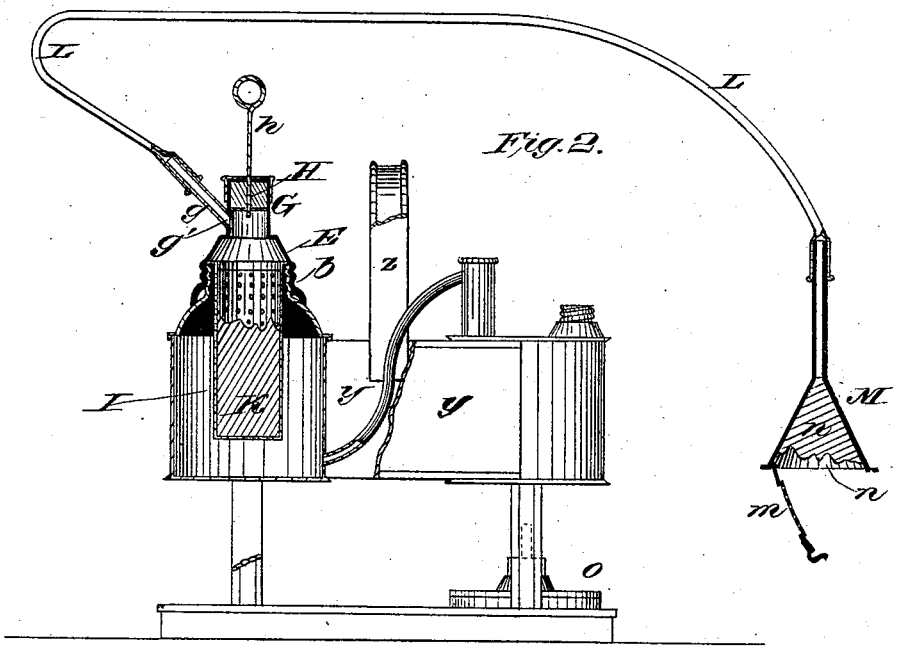
Fig. 2.
Fig. 3.
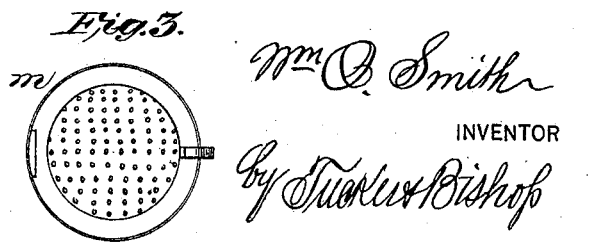
WITNESSES
John B. Foote
W. B. Hale
Wm. O. Smith
INVENTOR
By Tucker & Bishop
ATTORNEY

UNITED STATES PATENT OFFICE.

WILLIAM O. SMITH, OF KINMUNDY, ILLINOIS.

IMPROVEMENT IN STEAM-VAPORIZERS.

Specification forming part of Letters Patent No. 200,154, dated February 12, 1878; application filed June 21, 1877.

*To all whom it may concern:*

Be it known that I, WILLIAM O. SMITH, of Kinmundy, in the county of Marion and State of Illinois, have invented certain new and useful Improvements in Steam-Vaporizers; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention consists mainly in providing in a steam-vaporizer a dry-steam chest, to which the steam is led by a pipe from the boiler, and in which it first comes in contact with the medicine to be atomized.

The various details of construction involved in my invention will be hereinafter fully described, with reference to the accompanying drawing, in which—

Figure 1 is a view, in elevation, of a steam-vaporizer constructed according to my invention. Figure 2 is a similar view, partly in section; and Fig. 3 is a front view of the perforated mouth-piece.

A is the boiler, supported upon legs $a$, which rest in and are attached to the base-pan P. B is the dry-steam chest, supported upon legs $a'$, which also rest in and are attached to the base-pan. C is a steam-dome, from near the top of which the steam-pipe D leads, and enters dry-steam chest B near the bottom thereof.

In the top of the dry-steam chest B is a screw-tap, $b$, upon which fits a cover, E, and from the top of this cover a chamber, G, extends upward. From one side of this chamber, a short distance from its base, projects a short tube, $g$. Within the chamber G works a steam-tight piston or valve, H, made of cork or other suitable material, and it is operated by a rod, $h$, which projects through the cover of chamber G. When this piston or valve is depressed, it closes the port $g'$, from which the tube $g$ leads, and, when raised, leaves said port open, as shown in Fig. 2.

I (shown in Fig. 2) is a perforated circular or cylindrical box. (Shown in central vertical section.) This perforated box projects downward through the center of dry-steam chest B, being supported upon the top edge of screw-tap $b'$ by a slight rim or lip. It extends downward to a point a short distance above the port at which the steam-pipe D leads into the dry-steam chest B.

The top of this perforated box is open to chamber G, and within said perforated box is a sponge, K, or other porous substance, which is to contain the medicine to be vaporized. This sponge may be changed as often as desired.

Connected with the short tube $g$, which projects from the side of chamber G, is a flexible tube, L, of india-rubber or other suitable material. This flexible tube may be of any desired length, and terminates in a funnel-shaped mouth-piece, M, having a hinged perforated lid, $m$, a front view of which is shown in Fig. 3. Within the funnel-shaped mouth-piece is a sponge, $n$. (Shown in the sectional view of said mouth-piece in Fig. 2.)

O is a spirit-lamp, placed under the boiler A, for generating steam. $y$ designates side pieces of frame-work, which are soldered to the boiler and dry-steam chest, for the purpose of holding them in position and strengthening the apparatus. $z$ is a handle or bail, by which the apparatus may be carried.

The operation of my invention is as follows: A sufficient quantity of the medicine to be vaporized having been placed in the sponge K, it is placed in the perforated box I, which is then inserted into the dry-steam chest B, its rim resting upon the top edge of screw-tap $b$. The cover E is then screwed upon the tap $b$, and the piston or valve H is depressed, so as to close the port $g'$. The boiler is then filled about two-thirds or three-fourths full of water through tap $x$, which must then be tightly closed by screwing on the cover thereof. It should be seen that the rubber tube L is snugly connected with the short tube $g$ and the funnel-shaped mouth-piece M, the covers all tightly screwed home, and the lid of the funnel-shaped mouth-piece closed and latched.

The apparatus is now in readiness for operation, and the lamp beneath the boiler may be lighted. When steam is raised the drier portion passes into the steam-dome C, and thence, through steam-pipe D, to dry-steam chest B, filling it and surrounding the perforated box I, through the perforations of which it passes to sponge K, and, as the pressure increases, forces itself through said sponge, and, with further increased pressure, lifts piston or valve H, and courses through rubber tube L to mouth-piece M, through the sponge in which and perforated lid of which it escapes, loaded with the medicine, which it vaporizes in its passage through the perforated box I and medicated sponge K.

By means of the flexibility of the rubber tube L, the mouth-piece may be located in any place or position convenient for the inhalation by the patient of the vaporized medicine.

Having now described my invention in such full and concise language that it may be readily constructed and used by those skilled in the art most nearly connected therewith, I claim—

1. In a steam-vaporizer, the combination of the boiler A, the separate dry-steam chest B, steam-pipe D, colander I, tube L, and inhaling-funnel M, as described.

2. The combination, with the dry-steam chest B and tube L, of the valve H and top chamber G, as described.

3. The inhaling-funnel M, provided with the perforated hinged lid $m$ and sponge $n$, as set forth.

In testimony that I claim the foregoing as my own I affix hereto my signature in presence of two witnesses.

WILLIAM O. SMITH.

Witnesses:
 HENRY C. MUNGER,
 A. NEEPER.